United States Patent Office 3,792,068
Patented Feb. 12, 1974

3,792,068
DRY POWDER AEROSOL ANTIPERSPIRANT COMPOSITION INCORPORATING DRY POWDER ANTIPERSPIRANT ACTIVE COMPLEX AND PROCESS FOR ITS PREPARATION
Wilmer L. Luedders, Cincinnati, and Douglas L. Danneman, Forest Park, Ohio, assignors to The Procter & Gamble Company, Cincinnati, Ohio
No Drawing. Continuation-in-part of abandoned application Ser. No. 59,693, July 30, 1970. This application Apr. 2, 1971, Ser. No. 130,833
Int. Cl. C07f 7/00
U.S. Cl. 260—429.3        7 Claims

ABSTRACT OF THE DISCLOSURE

Aluminum chlorhydroxide, zirconyl hydroxychloride and glycine, in a ratio of about 7.5:4.6:2.0 parts by weight are co-dried from an aqueous solution to a moisture of from about 0.5% to about 15% to form a powder antiperspirant active complex for incorporation into powder aerosol antiperspirant compositions.

CROSS REFERENCE TO RELATED APPLICATION

This application is a continuation-in-part of the copending application of Wilmer L. Luedders and Douglas L. Danneman, Ser. No. 59,693 filed July 30, 1970, now abandoned.

BACKGROUND OF THE INVENTION

Field of the invention

This invention relates to an antiperspirant; and more particularly is concerned with aerosol antiperspirant powder spray compositions containing a powder antiperspirant active complex, prepared by a novel process.

Antiperspirant compositions in the form of aqueous creams, lotions, sticks, roll-ons and the like have been known in the art for many years. More recently, aerosols under pressure have become popular as a convenient form for application to the skin. Most preferred of the aerosol compositions are those in which the antiperspirant active is chiefly propellant. Such compositions apply the active antiperspirant salt to the skin effectively and feel dry, smooth and comfortable. Furthermore, because the antiperspirant compound is suspended rather than being dissolved in a liquid, it is not corrosive to ordinary metal aerosol cans, and it is, therefore, unnecessary to use specially lined cans or unbreakable glass bottles. Such powder compositions are further advantageous in that they are generally less irritating to the skin.

Typically, such a powder aerosol composition contains one or more metallic, acidic astringent salts as the antiperspirant active; i.e., for perspiration control. In addition, a suspending agent is employed to keep the antiperspirant compound from agglomerating or settling out and packing tightly at the bottom of the aerosol container. A carrier liquid is added so that the stream issuing from the aerosol container is a moist spray which effectively adheres to the skin instead of a dusty cloud which does not adhere as well. A propellant is added to force the antiperspirant composition out of the container. Minor adjuncts such as antimicrobial compounds and perfumes are optional.

The prior art

U.S. Pat. 2,814,585 discloses an aqueous antiperspirant composition, the preferred embodiments of which include zirconyl chloride (zirconium oxychloride), aluminum chlorhydroxide (ACH) and glycine. Examples are given for a variety of compositions including a cream, a lotion and a liquid antiperspirant. A later patent, U.S. 2,854,382, discloses that zirconyl hydroxy chloride is preferred over zirconyl chloride. Both of these references are specifically directed toward the use of the active ingredients dissolved in a liquid non-aerosol composition.

In addition to the above prior art, U.S. Pat. 3,288,681 granted to Goldberg et al. on Nov. 29, 1966; Netherlands Pat. 66/13943 granted to Spitzer et al. on Apr. 4, 1968; and British Pat. 987,301 granted to Shulton, Inc., on Mar. 24, 1965 disclose various powder aerosol systems.

Accordingly, it is an object of the present invention to provide an advantageous, homogeneous powder antiperspirant complex, non-corrosive and non-irritating in nature.

It is another object of the present invention to provide highly efficacious, comfortable and convenient powder antiperspirant aerosol compositions for application to the skin.

It is still another object of the present invention to provide a novel convenient and economical process for the preparation of said novel antiperspirant powder complex.

These and other objects which will become apparent are further defined in the disclosures hereinafter.

SUMMARY OF THE INVENTION

It has been discovered that a highly effective powder antiperspirant complex is formed by a novel process of co-drying of components previously mixed together in an aqueous solution, said process comprising:

(A) Co-dissolving in water (i) one part of an astringent aluminum salt having the formula $Al_2(OH)_{6-m}X_m$ wherein X is an anion selected from the group consisting of chloride, bromide and iodide, $m$ is a number of from .8 to 1.2;

(ii) $n$ parts of a zirconium salt having the formula ZrY wherein Y is an anion selected from the group consisting of —O(OH)Cl and $OCl_2$, $n$ having a value of from about .16 to about 1.2; and (iii) $p$ parts of a neutral amino acid, $p$ having a value of from about 0.06 to about .53;

(B) Co-drying the resultant mixture at a temperature of from about 100° C. to about 230° C. to a moisture level of from about 0.5% to about 15% by weight; and (C) Comminuting the resultant dried inorganic-organic antiperspirant complex into the form of an impalpable powder.

It has also been discovered that the dry antiperspirant complex formed by the above process can be incorporated into aerosol compositions which comprise:

(A) From about 1% to about 12% by weight of an inorganic-organic powder antiperspirant complex as formed above;

(B) From about 0.1% to about 5% by weight of a suspending agent;

(C) From about 1% to about 15% by weight of a carrier liquid of low volatility; and (D) An anhydrous liquefiable gas propellant in an amount sufficient to produce an aerosol spray.

DETAILED DESCRIPTION OF THE INVENTION

Co-drying process of preparation of powder antiperspirant active complex

It has been surprisingly found that when an astringent aluminum salt, a zirconium salt, and a neutral amino acid are co-dried to a final moisture content of from about .5% to about 15% by weight, preferably from about 1% to about 5%, that a powder complex is formed which has unexpected, superior characteristics not possessed when the components are dried separately and combined by simple physical mixing.

More specifically, it has been surprisingly found that the unusually effective powder antiperspirant complex results when prepared by the following method which comprises:

(a) Co-dissolving in water (i) one part $Al_2(OH)_{6-m}X_m$, where X is an anion selected from the group consisting of chloride, bromide and iodide and $m$ is a number from about .8 to about 1.2;

(ii) $n$ parts ZrY, where Y is an anion selected from the group consisting of —O(OH)Cl, —OCl$_2$, and where $n$ is a number from about .16 to about 1.2;

(iii) $p$ parts neutral amino acid selected from the group consisting of glycine, dl-tryptophane, dl-$\beta$-phenylalanine, dl-valine, dl-methionine and $\beta$-alanine, and where $p$ is a number from about .06 to about .53; and (b) Co-drying at a temperature of from about 100° C. to about 230° C. to a moisture content of from about 0.5% to about 15% by weight.

In addition to the above steps, an additional step (c) which comprises comminuting the dried complex into the form of a uniform impalpable powder is necessary before said complex is embodied into an aerosol composition.

In particular, an aqueous milieu is prepared comprising a combination of an astringent aluminum salt (i), an astringent zirconium salt (ii), and an amino acid (iii) in a weight ratio range of about 7.5:9.2–1.2–4.0–0.5 for (i), (ii) and (iii) respectively. Preferably, the ratio is 7.5:4.6:2.0 parts by weight.

Examples of suitable astringent aluminum salts (i) include aluminum hydroxybromide, aluminum hydroxyiodide and aluminum chlorhydroxide. Most preferred is aluminum chlorhydroxide having the formula:

$$Al_2(OH)_5Cl \cdot 2H_2O$$

Aluminum chlorhydroxide (ACH) is a well-known, effective antiperspirant salt and is readily commercially available.

Examples of suitable zirconium salts (ii) include zirconium oxychloride and zirconyl hydroxy chloride (ZHC). Zirconyl hydroxy chloride (ZHC) having the formula $ZrO(OH)Cl \cdot 3H_2O$ is most preferred for purposes of the present invention. ZHC is a well-known, effective antiperspirant salt which is readily commercially available.

Suitable neutral amino acids for the purposes of the present invention include glycine, dl-tryptophane, dl-β-phenylalanine, dl-valine, dl-methionine and β-alanine. Most preferred is glycine having the formula $$CH_2(NH_2)COOH$$

Glycine is well known and is readily commercially available.

The aqueous solution containing the three components described heretofore is then "co-dried" until a moisture content of from about 0.5% to about 15%, preferably from about 1% to about 5% is achieved. While the means used to dry the aqueous solution are not critical, it should be pointed out that temperatures above about 233° C. should be avoided, as above this temperature there is danger of amino acid decomposition. Examples of satisfactory drying means include ordinary oven drying, spray drying, drum drying, vacuum drying, microwave drying, or the like.

Heretofore, when aluminum chlorhydroxide was dried to a moisture level of from about 15% or less by means disclosed in the prior art, its antiperspirant effectiveness was imparted because of decreased solubility. By utilizing the co-drying process of the present invention, it is possible to reduce the moisture content to low moisture levels without diminishing antiperspirant activity.

After the components have been co-dried to the desired level of moisture, the resultant complex is subjected to a comminution to achieve a uniform satisfactory particle size. Depending on the type of comminution equipment utilized, it may be necessary to pass the comminuted powder through a sieve to further achieve uniformity and eliminate oversize. Examples of suitable comminution processes include ball milling, roller milling, passing through a colloid mill, jet impact mill, or other suitable means.

The particle size of the antiperspirant complex should be small enough such that an even spray is achieved and nozzle and valve malfunction is avoided. A particle size of about 100 microns in diameter is suitable with the preferred size being from 10 microns to about 25 microns in diameter. The result is a highly effective, non-corrosive and essentially non-irritating antiperspirant powder complex for incorporation into a variety of powder aerosol compositions for use on the skin.

Incorporation of powder antiperspirant active complex into aerosol compositions A powder aerosol antiperspirant composition incorporating the above-described antiperspirant complex is formulated by combining the following components:

(a) from about 1% to about 12% by weight of an astringent antiperspirant complex of the type disclosed above;

(b) from about 0.1% to about 5% by weight of a suspending agent;

(c) from about 1% to about 15% by weight of a carrier liquid; and (d) a sufficient amount of an anhydrous gas propellant to produce an aerosol spray.

COMPONENT A

For the purpose of the present invention, the preferred antiperspirant compound is an inorganic-organic complex which has been described in detail heretofore.

Between about 1% and about 12% by weight, preferably from about 2.5% to about 6% by weight incorporated into an aerosol composition has been found to give superior antiperspirant effectiveness. Below about 1%, the antiperspirant effectiveness falls off. Above 12% is not practical economically because the antiperspirant effectiveness does not increase commensurate with additional quantities used, in addition to causing handling and atomization problems.

COMPONENT B

The suspending agent keeps the powder antiperspirant complex in suspension within the composition. Although some settling may occur, the antiperspirant complex remains in a readily redispersible state. Suitable suspending agents include a colloidal silica of a particle size below .03 micron. Colloidal silica as taught by Spitzer in Netherlands application 66/13943 (Apr. 4, 1968) is available commercially as Cab-O-Sil M-5 (trademark), a submicroscopic particulated pyrogenic silica. Another suitable suspending agent for the invention is a hydrophobic clay which is the reaction product of clay and a quaternary ammonium surfactant. Such a hydrophobic clay is available commercially as Bentone-38 (trademark). Primary aliphatic amines of from $C_{12}$–$C_{20}$ are also available, as taught in the co-pending application of Charles L. Scripps and Jerry J. Yetter, Ser. No. 888,959, filed Dec. 29, 1969. Examples of such compounds include lauryl amine, stearyl amine, tetradecyl amine, hexadecyl amine, octadecyl amine, and eicosyl amine. Still other suitable suspending agents are aliphatic monoalkylol amides having a fatty acid carbon chain of from about $C_{12}$–$C_{20}$, and 2 or 3 carbon atoms in the alkylol chain as disclosed in the co-pending application of Douglas A. Danneman and Jerry J. Yetter, Ser. No. 888,958, filed Dec. 29, 1969. Examples include coconut monoethanol amide, octadecyl monoethanol amide and stearyl monoethanol amide.

Any of the suspending agents described supra can be used in amounts of from about 0.1% to about 5% by weight. Amounts of suspending agents of from about 0.3% to about 0.8% are preferred. The especially preferred suspending for the purpose of this invention is Bentone-38.

COMPONENT C

A carrier liquid of low volatility is used in the instant invention so that the stream issuing from the aerosol container is a moist spray rather than a gritty, dusty cloud. This imparts a cosmetic feeling to the skin when applied thereto and reduces the likelihood of breathing the otherwise dry powder. The carrier liquid also aids efficacy by keeping the antiperspirant compound in contact with the skin so that it does not flake off or wash off. Thus, the carrier liquid is needed for the practical use of the invention. Examples are carboxylic esters like isopropyl myristate and isopropyl palmitate; hydrocarbons like mineral oil and tetradecane; alcohols such as lauryl alcohol, hexadecyl alcohol, and oleyl alcohol; carboxylic acids such as lauric and oleic acid; lanolin and its derivatives such as acetylated lanolin; and silicone oils such as dimethylpolysiloxane. Other operable carrier liquids are more hydrophilic than the above-mentioned compounds, for example, organic compounds containing multiple ester groups. This includes, but is not limited to, diesters of dibasic organic acids. Examples of compounds containing multiple ester groups that are suitable for the instant invention are di-n-butyl phthalate, diethyl sebacate, diisopropyl adipate, and ethyl ethylcarbomethyl phthalate [ortho $C_2H_5OOC-\phi-COOCH_2COOC_2H_5$].

Still other operable carrier liquids are even more hydrophilic than these esters. Among them are polyethylene glycol monolaurate and butoxy-polyoxyethylene oxypropylene glycols [the Ucon 50 HB series; trade mark—Union Carbide].

Among these various carrier liquids, carboxylic esters having from about 12 to about 16 carbon atoms are preferred. As described supra, they can be either aliphatic or aromatic and can contain either one ester group or multiple ester groups. Especially preferred are di-n-butyl phthalate, diethyl sebacate, diisopropyl adipate, and ethyl ethylcarbomethyl phthalate.

Any of the carrier liquids described supra can be used in amounts from about 1% to about 15%. Below about 1% the carrier liquid is insufficient to form a moist spray and the spray is, therefore, undesirably dusty and gritty and does not adhere well to the skin. Above about 15% the composition deposited upon the skin feels undesirably oily and greasy. Amounts of carrier liquid from about 6% to about 10% are preferred.

COMPONENT D

The propellant gas of the instant invention can be any liquefiable gas conventionally used for aerosol containers. Examples of materials that are suitable for use as propellants are trichlorofluoromethane, dichlorodifluoromethane, dichlorotetrafluoroethane, monochlorodifluoromethane, trichlorotrifluoroethane, propane, butane, and isobutane, used singly or admixed. Trichlorofluoromethane, dichlorodifluoromethane, dichlorotetrafluoroethane, and isobutane, used singly or admixed, are preferred.

The amount of the propellant gas is governed by normal factors as well known in the aerosol art. It is satisfactory to consider the propellant as constituting the balance of the composition of the instant invention that is not accounted by the other components as detailed herein. The preferred limits of propellant are therefore from about 70.7% to about 93.9%. Especially preferred limits are from about 80% to about 92%.

It will be understood that other ingredients may be added to the above composition in minor proportions without affecting the nature of the invention. An example of such an additional ingredient is perfume used in amounts up to about 0.8% by weight. Another example is the addition of an antimicrobial compound such as hexachlorophene, trichlorocarbanilide, trifluoromethylcarbanilide, 2,4,4'-trichloro-2'-hydroxy diphenyl ether or brominated salicylanilide, which, when added in amounts of up to about 0.5% by weight, inhibit bacterial action upon perspiration and reduce odors resulting therefrom.

The following examples are submitted to further illustrate, but in no way limit this invention.

Example I further illustrates the method for the production of the powder antiperspirant active complex. Examples II through VIII further illustrate various aerosol compositions embodying the powder antiperspirant active complex and method for their preparation. In addition to Examples II through VIII other suitable compositions into which the antiperspirant powder complex of the present invention can be embodied as the active component are found in U.S. applications Ser. Nos. 888,958 and 888,959, filed Dec. 29, 1969; U.S. Pats. 2,236,387, 3,288,681 and 2,405,153; British Pat. 987,301 and Netherlands application 66/13943. Such references are incorporated in and made part of this application by reference.

SPECIFIC EMBODIMENTS OF THE INVENTION

Example I

A process for the preparation of the powder antiperspirant complex of the present invention is as follows:

15.0 parts by weight of aluminum hydroxychloride (50% aqueous solution) was added to a beaker. Glycine was then added in an amount of 2.0 parts by weight and dissolved with the aid of a suitable mixer. Zirconyl hydroxychloride (33⅓% aqueous solution) was then added and mixed in an amount of 13.8 parts by weight. The combined components were then mixed until co-dissolved. The co-dissolved solution was then dried in an oven at a temperature of about 120° C. until a moisture content of 3% was attained. The dried solution now in a solid state was then placed into a ball mill and milled for about four hours which resulted in a fine powder. The powder was then passed through a 325 mesh screen to obtain a uniform size product. The result was a powder antiperspirant active complex for incorporation into an aerosol composition.

Example II

The following components are used to prepare in aerosol antiperspirant powder spray:

| Component: | Percent by weight |
|---|---|
| ZAG [1] | 3.50 |
| Isopropyl myristate | 8.00 |
| Bentone-38 | 0.60 |
| Ethyl alcohol (95%) | 0.27 |
| Hexachlorophene | 0.10 |
| Perfume | 0.40 |
| Propellant [2] | Percent Q.s.___ 100 |

[1] Zirconyl hydroxychloride/Aluminum hydroxychloride/glycine, antiperspirant powder complex as prepared in Example I.
[2] CCl₃ (stabilized) :CCl₂F₂ :CClF₂—CClF₂-n-butane (20 :10 : 50 :20).

An aerosol antiperspirant utilizing the above composition is prepared as follows:

45.5 grams of hexachlorophene are dissolved in 8.0 pounds of isopropyl myristate using a high speed mixer at a temperature of about 70° F. .6 pound of Bentone-38 and 3.5 pounds of the ZAG active powder complex are then added to the batch and mixed for about 5 minutes at a temperature of 70° F. The ethanol (95%) is then added to the mixture for about 10 minutes at the 70° F. temperature. While the mixing continues, the temperature is slowly increased (2°–3° F. 1 min.) until a temperature of from about 130°–150° F. is attained. The mixture is subsequently cooled to a temperature of about 110° F. while the mixing continues. The perfume is now added. The mixing is continued at a temperature of from about 100° F. to about 110° F. until the mixture becomes homogeneous. The mixture is allowed to cool to about room temperature and is subsequently charged into an aerosol container. The propellant is then added to the container using an under the cap filler.

The result is a high effective powder aerosol antiperspirant composition for use on the skin.

The same process is used to prepare compositions identical to the foregoing except that different kinds of propellants are used as shown in the following table. In each case the general properties and the antiperspirant effectiveness of the composition when applied to the skin are substantially the same as that discussed above.

propyl palmitate, mineral oil, tetradecane, lauryl alcohol, hexadecyl alcohol, oleyl alcohol, lauric acid, oleic acid, lanolin, acetylated lanolin, dimethypolysiloxane, diethyl sebacate, diisopropyl adipate, and ethyl ethylcarbomethyl phthalate [ortho $C_2H_5OOC-\phi-COOCH_2COOC_2H_5$]. Said compositions are prepared substantially as disclosed in Example II. Results substantially equivalent to those obtained in Example IV are obtained in each case.

Compositions identical to those disclosed in Example IV are prepared except that stearoyl monoethanol amide is replaced by Cab-O-Sil M–5, Bentone-38, lauryl amine, stearyl amine, tetradecyl amine, hexadecyl amine, octadecyl amine, eicosyl amine, coconut monoethanol amide and octadecyl monoethanol amide. Said compositions are prepared utilizing procedures disclosed in Example II.

| Propellant | Percent by weight on a propellant basis | | | | | | | | | | | | |
|---|---|---|---|---|---|---|---|---|---|---|---|---|---|
| | a | b | c | d | e | f | g | h | i | j | k | l | m |
| Trichlorofluoromethane | 100 | | | | | | | | 40 | | | 60 | 30 |
| Dichlorodifluoromethane | | 100 | | | | | | | 30 | 40 | 30 | | |
| Dichlorotetrafluoroethane | | | 100 | | | | | | | 60 | 40 | | |
| Monochlorodifluoromethane | | | | 100 | | | | | | | | 40 | |
| Trichlorotrifluoroethane | | | | | 100 | | | | | | | | 30 |
| Propane | | | | | | 100 | | | | | 30 | | |
| Butane | | | | | | | 100 | | 30 | | | | 40 |
| Isobutane | | | | | | | | 100 | | | | | |
| Total | 100 | 100 | 100 | 100 | 100 | 100 | 100 | 100 | 100 | 100 | 100 | 100 | 100 |

[1] 100% propellant is equivalent to 87.5% of the composition.

Example III

An aerosol antiperspirant dry powder spray was formed from components indicated below following substantially the same procedures described in Example II.

| Component: | Percent by weight |
|---|---|
| ZAG [1] | 3.50 |
| Isopropyl myristate | 8.00 |
| Cab-O-Sil (M–5 or H–5) | 0.60 |
| Hexachlorophene | 0.10 |
| Perfume | 0.40 |
| Propellant [2] | percent Q.s. 100 |

[1] Zirconyl hydroxychloride/aluminum chlorhydroxide/glycine powder antiperspirant active prepared as disclosed in Example I.
[2] $CCl_3F : CCl_2F_2$ (60/40) by weight.

When dispensed from an aerosol container, a dry highly effective antiperspirant powder forms on the skin.

Compositions identical to the foregoing in Example III are prepared as disclosed in Example III, except that hexachlorophene is replaced with trichlorocarbanilide, trifluoromethyl carbanilide, tribromosalicylanide and 2,4,4'-trichloro-2'-hydroxy diphenyl ether. The results are substantially equivalent to those obtained in Example III.

Example IV

The following components are used to prepare an aerosol antiperspirant powder spray, utilizing the procedures disclosed in Example II.

| Component: | Percent by weight |
|---|---|
| ZAG [1] | 3.50 |
| Dibutyl phthalate | 8.00 |
| Stearoyl monoethanol amide | 0.60 |
| Trichlorocarbanilide | 0.10 |
| Perfume | 0.40 |
| Propellant [2] | percent Q.s. 100 |

[1] Zirconyl hydroxychloride/aluminum chlorhydroxide/glycine antiperspirant powder complex prepared substantially as disclosed in Example I.
[2] $CCl_3 : CCl_2F$ : butane (40:30:30) by weight.

A highly effective aerosol powder antiperspirant spray results.

Compositions identical to those disclosed in Example IV are prepared as disclosed in Example II, except that dibutyl phthalate is replaced by isopropyl myristate, iso- Equivalent results to those obtained in Example IV are obtained in each case.

Examples V–VIII

Antiperspirant aerosol Compositions V–VIII were formed from the following components utilizing procedures substantially as described in Example II.

| Component | Percent by weight | | | |
|---|---|---|---|---|
| | V | VI | VII | VIII |
| ZAG [1] | 3.50 | 3.50 | 3.50 | 3.50 |
| Isopropyl myristate | 8.00 | 8.00 | 8.00 | |
| Bentone-38 | 0.60 | 0.60 | | 0.60 |
| EtOH/H²O 95/5% wt | 0.27 | 0.27 | | 0.27 |
| Trichlorocarbanilide | 0.10 | | | |
| Geigy 3565 [2] | | 0.10 | | |
| Alon [3] | | | 0.60 | |
| Hexachlorophene | | | 0.10 | 0.10 |
| Dibutyl phthalate | | | | 8.00 |
| Perfume | 0.40 | 0.40 | 0.40 | 0.40 |
| Propellant [4] | Q.s. 100 | Q.s. 100 | Q.s. 100 | Q.s. 100 |

[1] Zirconyl hydroxychloride: Aluminum chlorhydroxide-glycine antiperspirant powder complex prepared substantially as disclosed in Example I.
[2] 2,4,4'-trichloro-2'-hydroxydiphenyl ether.
[3] Fumed alumina ($Al^2O^3$) (DuPont).
[4] $CCL_3 F : CCL_2 F_2$ (60/40) by weight.

Each of the above compositions is a highly effective dry aerosol powder antiperspirant for use on the skin.

What is claimed is:

1. A process for the preparation of novel antiperspirant complexes which comprises the steps of:
   (A) Co-dissolving in water
      (1) one part $Al_2(OH)_{6-m}X_m$, wherein X is an anion selected from the group consisting of chloride, bromide and iodide and m is a number from about 0.8 to about 1.2;
      (2) n parts ZrY wherein Y is an anion selected from the group consisting of —O(OH)Cl and $OCl_2$, and where n has a value of from about .16 to about 1.2;
      (3) p parts neutral amino acid selected from the group consisting of glycine, dl-tryptophane, dl-β-phenylalanine, dl-valine, dl-methionine and β-alanine, and where p has a value of from about 0.06 to about .53;
   (B) Co-drying the resultant mixture at a temperature of from about 100° C. to about 230° C. to a moisture level of from about 0.5% to about 15% by weight; and (C) Comminuting the resultant dried inorganic-organic antiperspirant complex into the form of an impalpable powder.

2. The process of claim 1 where in step (A)(1), X is chloride and $m$ has a value of about 1.

3. The process of claim 1 where in step (A)(2), Y is —O(OH)Cl, and $n$ has a value of about 0.6.

4. The process of claim 1 where in step (A)(3), the neutral amino acid is glycine, and $p$ has a value of about 0.26.

5. The powder antiperspirant complex prepared by the process of claim 1.

6. A process for the preparation of novel antiperspirant complexes which comprises the steps of:
(A) Co-dissolving in water
(1) one part $Al_2(OH)_{6-m}X_m$, wherein X is an anion selected from the group consisting of chloride, bromide and iodide and $m$ is a number from about 0.8 to about 1.2;
(2) $n$ parts ZrY wherein Y is an anion selected from the group consisting of —O(OH)Cl and $OCl_2$, and where $n$ has a value of from about .16 to about 1.2;
(3) $p$ parts neutral amino acid selected from the group consisting of glycine, dl-tryptophane, dl-β-phenylalanine, dl-valine, dl-methionine and β-alanine, and where p has a value of from about 0.06 to about .53; and
(B) Co-drying the resultant mixture at a temperature of from about 100° C. to about 230° C. to a moisture level of from about 0.5% to about 15% by weight.

7. The antiperspirant complex prepared by the process of claim 6.

References Cited
UNITED STATES PATENTS

| | | | |
|---|---|---|---|
| 3,407,254 | 10/1968 | Siegal et al. | 260—429.3 X |
| 2,814,585 | 11/1957 | Daley. | |
| 2,854,382 | 10/1968 | Grad. | |
| 2,641,604 | 6/1953 | Maistre et al. | 260—448 R |
| 2,907,781 | 10/1959 | Hermelin | 260—448 R |

OTHER REFERENCES

Chemical Abstracts, vol. 74, 146962q (1971).

HELEN M. S. SNEED, Primary Examiner

U.S. Cl. X.R.

260—448; 424—47

UNITED STATES PATENT OFFICE
CERTIFICATE OF CORRECTION

PO-1050
(5/69)

Patent No. 3,792,068  Dated February 12, 1974

Inventor(s) Wilmer L. Luedders & Douglas L. Danneman

It is certified that error appears in the above-identified patent and that said Letters Patent are hereby corrected as shown below:

Col. 3, line 29, "7.5:9.2-1.2-4.0-0.5" should read
-- 7.5:9.2-1.2:4.0-0.5 --.

Col. 4, lines 71 & 72, "Douglas A. Danneman" should read
-- Douglas L. Danneman --.

Col. 6, line 49, "in" should read -- an --.

Col. 7, line 9, "high" should read -- highly --.

Col. 8, line 43 "EtOH/H$^2$O" should read -- EtOH/H$_2$O --.

Col. 8, line 52, "Fumed alumina (Al$^2$O$^3$)" should read
-- Fumed alumina (Al$_2$O$_3$) --.

Signed and sealed this 9th day of July 1974.

(SEAL)
Attest:

McCOY M. GIBSON, JR.
Attesting Officer

C. MARSHALL DANN
Commissioner of Patents